United States Patent
Chiu et al.

(10) Patent No.: US 9,002,516 B2
(45) Date of Patent: Apr. 7, 2015

(54) CALIBRATION METHOD FOR TOOL CENTER POINT OF A ROBOT MANIPULATOR

(71) Applicants: Long-En Chiu, New Taipei (TW); Yong Wu, Shenzhen (CN)

(72) Inventors: Long-En Chiu, New Taipei (TW); Yong Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 274 days.

(21) Appl. No.: 13/648,416

(22) Filed: Oct. 10, 2012

(65) Prior Publication Data
US 2013/0123982 A1    May 16, 2013

(30) Foreign Application Priority Data
Nov. 11, 2011 (CN) .......................... 2011 1 0356649

(51) Int. Cl.
G05B 19/04 (2006.01)
G01L 25/00 (2006.01)
B25J 9/16 (2006.01)

(52) U.S. Cl.
CPC ..................................... B25J 9/1692 (2013.01)

(58) Field of Classification Search
CPC .................. G05B 2219/37275; G01B 11/002; G01B 21/042
USPC ........ 700/245, 250, 251, 254; 702/57, 85, 94, 702/95, 105
See application file for complete search history.

(56) References Cited

U.S. PATENT DOCUMENTS

| | | | |
|---|---|---|---|
| 2003/0200042 A1* | 10/2003 | Gan et al. | 702/105 |
| 2008/0234863 A1* | 9/2008 | Pagel et al. | 700/254 |
| 2009/0157226 A1* | 6/2009 | de Smet | 700/254 |
| 2011/0029131 A1* | 2/2011 | Ban et al. | 700/254 |
| 2011/0046782 A1* | 2/2011 | Fixell | 700/251 |

OTHER PUBLICATIONS

Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, DOI: 10.5772/6200. Available from: http://www.intechopen.com/books/robot_manipulators/calibration_of_robot_reference_frames_for_enhanced_robot_positioning_accuracy.*

* cited by examiner

Primary Examiner — Khoi Tran
Assistant Examiner — Robert Nguyen
(74) Attorney, Agent, or Firm — Novak Druce Connolly Bove + Quigg LLP

(57) ABSTRACT

A calibration method for calibration a tool center point for a robot manipulator includes the steps of: driving the tool to move above one of the inclined surfaces; defining a preset coordinate system TG; rotating the TCP relative to the UG-axis by about 180 degrees, calculating the value of $\Delta w$; updating the position parameters of the preset TCP, defining a new preset coordinate system TG'; rotating the TCP relative to the UG'-axis by about 90 degrees, calculating the value of $\Delta v$; updating the position parameters of the new preset TCP, defining a new preset coordinate system TG"; driving the tool to move above a planar horizontal surface; rotating the TCP relative to a axis by about 30 degrees, calculating the value of $\Delta u$; repeating the aforementioned steps until the deviation $\Delta P$ ($\Delta w$, $\Delta v$, $\Delta u$) is less than or equal to a maximum allowable deviation of the robot manipulator.

17 Claims, 7 Drawing Sheets

CALIBRATION METHOD FOR TOOL CENTER POINT OF A ROBOT MANIPULATOR

BACKGROUND

1. Technical Field

The present disclosure generally relates to calibration methods for robot manipulators, and particularly to a calibration method for a tool center point of a robot manipulator.

2. Description of Related Art

Robot manipulators are used in various industrial fields to fulfill the task requirements for product assembling, welding and other tasks automatically. A robot manipulator of related art may be equipped with a tool, such as a cutting device, a gripper, a glue dispenser or a fixture mounted to a distal end. The tool has a specific defined point, called the Tool Center Point (TCP), that is commanded to move to various positions in the workspace when a robot manipulator performs a task. In use, the operating accuracy of the robot manipulator directly depends on a robot control system knowing the precise position of the TCP relative to the robot manipulator's distal end. Since the tool may have been mounted to the distal end of the robot manipulator manually, an alignment error may arise between the tool and the robot manipulator, thereby causing the TCP to deviate from its expected position relative to the robot's distal end. Manual calibration of the position of the tool center point is time-consuming and inconvenient, and the precision of manually calibrating the tool center point is not guaranteed.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 2:
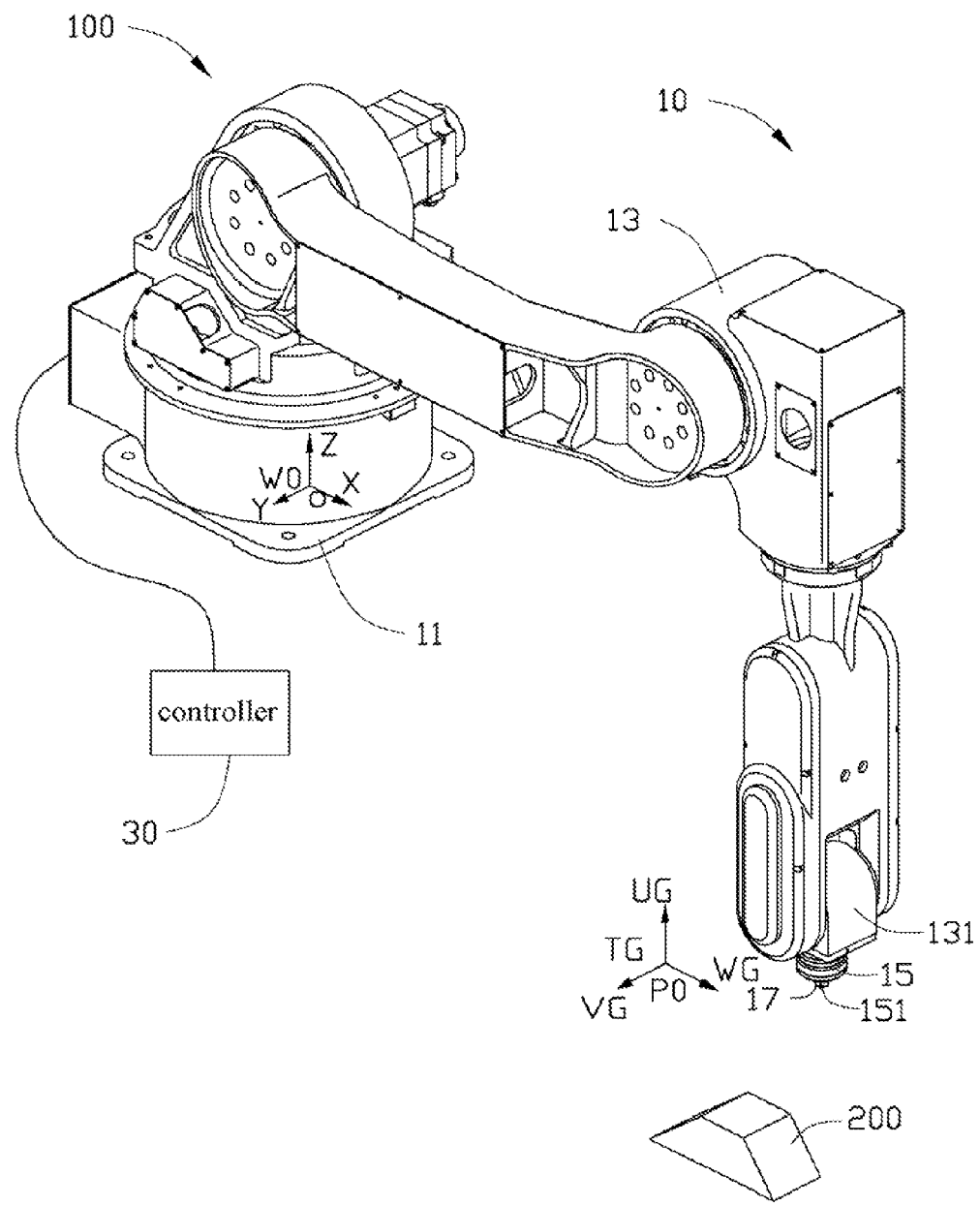
FIG. 2 shows an isometric view of the robot manipulator.
Figure 3:
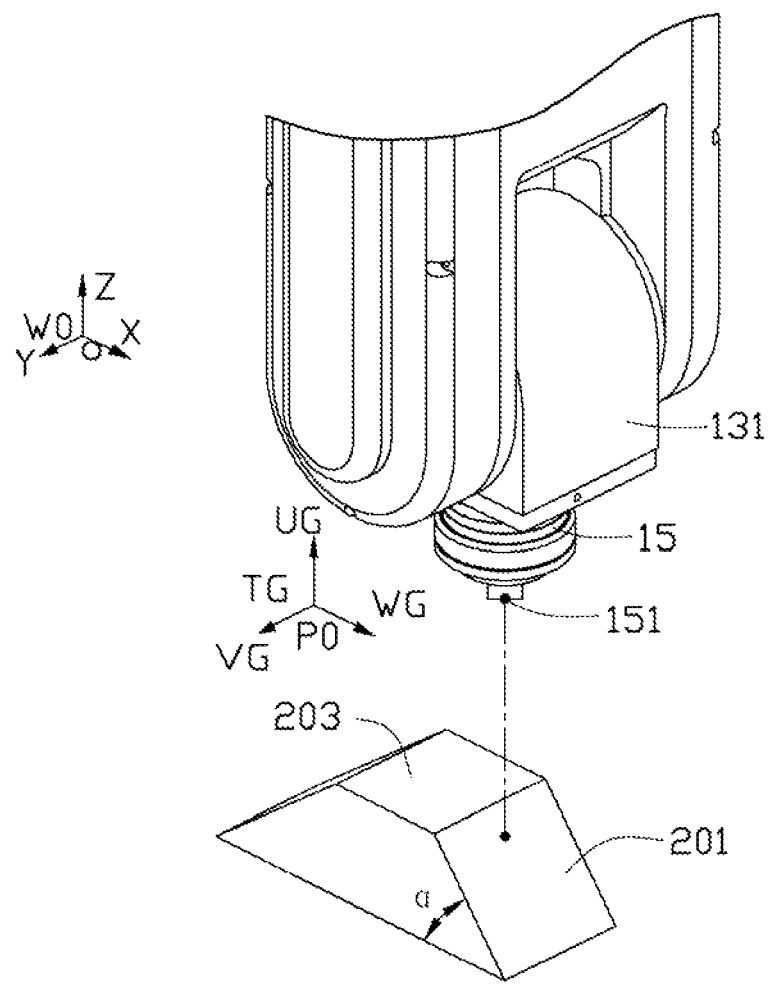
FIG. 3 shows a partially enlarged view of the robot manipulator of FIG. 2.

FIGS. 2 and 3, is an embodiment of a robot manipulator 100 together with a assistant indicating tool 200. The robot manipulator 100 includes a main body 10 and a controller 30 connected to the main body 10. The main body 10 includes a plurality of multiple mechanical linkages including a base 11, a drive mechanism 13, a tool 15 and a sensor 17. The drive mechanism 13 includes all physical components (such as motors, gears, and mechanical linkages) required to move the tool 15. The drive mechanism 13 is mounted on the base 11 and connected with the controller 30. The drive mechanism 13 includes an end mechanical linkage 131 at an end of the drive mechanism 13 away from the base 11. The tool 15 is assembled to a distal end of the end mechanical linkage 131. The sensor 17 is mounted on a distal end of the tool 15 for detecting or measuring a distance between the sensor 17 and the assistant indicating tool 200.

The controller 30 includes a preset control software (not shown and not illustrated) and a data storage facility (also not shown and illustrated) installed therein for driving and controlling the drive mechanism 13 to move the tool 15. In the illustrated embodiment, the drive mechanism 13 is a multi-axis drive mechanism controlled by the controller 30. The tool 15 having a defined tool center point (TCP) 151 formed at a distal end of the tool 15. The sensor 17 is a laser displacement sensor for detecting or measuring the distance between the sensor 17 and the assistant indicating tool 200. The sensor 17 is assembled within the tool 15. A laser radiating point of the sensor 17 coincides with the point of the TCP 151, or is at a precisely known position relative to the TCP 151. In the illustrated embodiment, the laser radiating point of the sensor 17 coincide with the point of the TCP 151. In another embodiment, the sensor 17 can be replaced by other displacement sensors, such as an ultrasonic displacement sensor. The robot manipulator 100 has a basic coordinate system for defining positions relative to the location of the robot manipulator. In the illustrated embodiment, the basic coordinate system is the basic work coordinate system W0 at the robot manipulator's base 11. The basic work coordinate system W0 includes three coordinate axes (X-axis, Y-axis and Z-axis) intersecting with each other perpendicularly. The point of origin of the basic work coordinate system W0 is defined as O (0, 0, 0). With the tool 15 mounted to the distal end of the robot manipulator's end mechanism linkage 131, the robot manipulator also has a basic tool coordinate system T0 (not shown) for defining the position of the tool's TCP relative to the robot manipulator's end linkage 131. The point of origin of the basic tool coordinate system is typically located at the center of a mounting flange (for mounting the tool) at the distal end of the end linkage 131. The TCP 151 of the tool 15 is positioned within the basic tool coordinate system T0 of the robot manipulator 100. The position of the TCP 151 within the basic tool coordinate system T0 is only known approximately due to tool misalignment after mounting; variances in tool fabrication also contributes to uncertainty in the position of the TCP 151. The object of the invention is to correct the position of the TCP 151 from an approximate estimated value to a highly accurate value.

The assistant indicating tool 200 is positioned on a horizontal surface under the tool 15, and the sensor 17 emits a laser beam as well as accepts the reflected laser beam. In the illustrated embodiment, the assistant indicating tool 200 is a substantially trapezoidal block, and includes a planar top surface 203 and a pair of inclined side surfaces 201 at opposite sides of the assistant indicating tool 200. Each inclined surface 201 defines an included angle a relative to the horizontal plane. The inclined surfaces 201 and the planar top surface 203 are both flat planes satisfying high precision metrology standards. In the illustrated embodiment, the included angle α therebetween is 45 degrees. It is noted that, the assistant indicating tool 200 can be other shapes including an inclined surface 201 and a planar top surface 203, such as a frustum of a pyramid.

Figure 1:
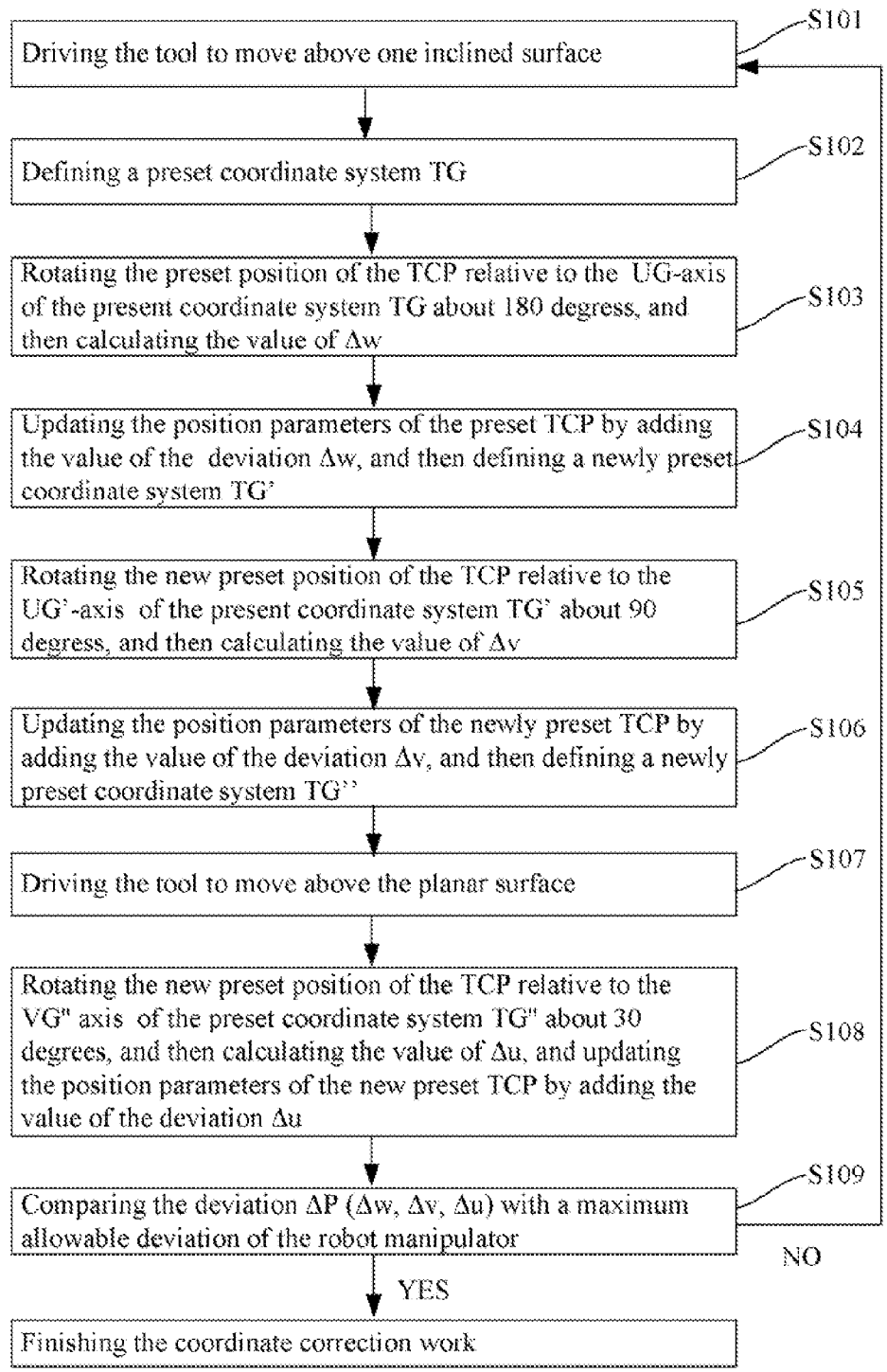
FIG. 1 shows a flow chart of an embodiment of a calibration method for a tool center point of a robot manipulator.

Also referring to FIG. 1, a calibration method of an embodiment for correcting the position of the TCP 151 of the robot manipulator 100 is illustrated as follows.

Figure 4:
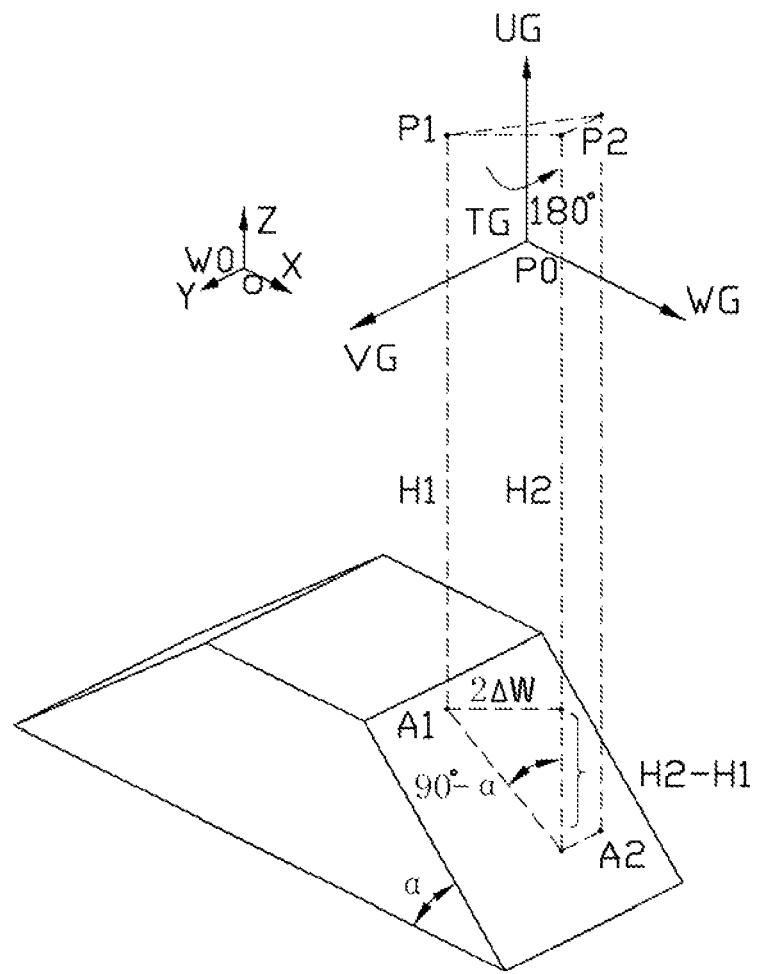
FIGS. 4 through 7 show four different coordinate views of the robot manipulator for illustrating the calibration method for tool center point of the robot manipulator of the embodiment.

Also referring to FIG. 4, in step S101, the tool 15 is driven to move toward the assistant indicating tool 200 and finally positioned upon and above one inclined surface 201. The sensor 17 emits laser beams toward the inclined surface 201 downwards, and forms a projected point A1 on the inclined surface 201. With the laser radiating point of the sensor 17 coinciding with the point of the TCP 151, the sensor 17 then measures a distance H1 between the TCP 151 and the projected point A1. The sensor 17 measures the distance H1 between the position P1 and the projected point A1 on the inclined surface 201.

In step S102, a preset position of the TCP 151 of the tool 15 is defined as P0 relative to the basic tool coordinate system T0, and the preset position P0 is an estimate of the actual position of the TCP 151 of the tool 15. The corresponding coordinate value of the preset position P0 of the TCP 151 within the basic tool coordinate system T0 is defined as ($X_g$, $Y_g$, $Z_g$). A preset coordinate system TG is thus established based on the preset position P0 of the TCP 151 of the tool 15. In the embodiment, the origin of the preset coordinate system TG is the preset position P0 of the TCP 151 of the tool 15. The preset coordinate system TG includes three coordinate axes WG-axis, VG-axis and UG-axis, and each coordinate axis of the preset coordinate system TG is positioned parallel to the corresponding three coordinate axes of the basic tool coordinate system T0, respectively. In addition, the VG-axis projects to the inclined surface 201 at a same height, and the UG-axis is perpendicular to the horizontal plane. The coordinate value of the origin/preset position P0 ($X_g$, $Y_g$, $Z_g$) of the preset coordinate system TG within the basic tool coordinate system T0 is stored into the preset control software of the controller 30. During use, the position of the preset position P0 of the TCP 151 of the tool 15 can be adjusted and moved by adjusting the position parameters of the preset position P0 of the TCP 151 of the tool 15 that are stored within the preset control software of the controller 30. The actual position of the TCP 151 of the tool 15 within the basic tool coordinate system T0 is defined as P1, and thus, the corresponding coordinate value of the actual TCP 151 formed within the basic tool coordinate system T0 is defined as P1 (X1, Y1, Z1). A deviation between the preset position P0 of the TCP 151 and the actual position of the TCP 151(P1) is defined as ΔP (Δw, Δv, Δu), namely, the deviation between the origin P0 ($X_g$, $Y_g$, $Z_g$) of the preset coordinate system TG and the actual position of the TCP 151 (P1) is defined as ΔP (Δw, Δv, Δu). Because X1=$X_g$+Δw, Y1=$Y_g$+Δv, Z1=$Z_g$+Δu, thus the actual position of the TCP 151 (P1) within the basic tool coordinate system is ($X_g$+Δw, $Y_g$+Δv, $Z_g$+Δu).

In step S103, the preset (i.e., estimated) position P0 of the TCP 151 of the tool 15 is driven to rotate about the UG-axis of the preset coordinate system TG by about 180 degrees, resulting in the actual position of the TCP 151 (P1) moving to a position P2. The corresponding coordinate value of the actual TCP 151 positioned at the position P2 relative to the preset coordinate system TG can be designated as P2 (W2, V2, U2). Note that if the preset position P0 had correctly represented the actual position of the TCP (P1), then the actual position of the TCP would remain unchanged after the rotation. Detection of any change in the actual position of the TCP after the rotation would indicate an error exists between the preset position P0 and the actual position P1. The sensor 17 detects change in the actual position of the TCP by emitting laser beams toward the inclined surface 201 downwards, and forms a corresponding projected point A2 on the inclined surface 201 after the rotation, and the sensor 17 then measures a distance H2 between the position P2 and the projected point A2 on the inclined surface 201. Since the TCP 151 of the tool 15 is rotated relative to the UG-axis direction of the preset coordinate system TG by about 180 degrees, the following mathematical functional relationships can be easily established: $|H2-H1|*\tan(90°-\alpha)=|H2-H1|/\tan\alpha=2|\Delta w|$. Thus the value of Δw can be easily calculated by means of the aforementioned mathematical functional relationships, namely, $|\Delta w|=|H2-H1|*\tan(90°-\alpha)/2=|H2-H1|/2*\tan\alpha$. In the illustrated embodiment where the surface 201 inclines downward along the positive WG-axis and the included angle α is 45 degree, the value of Δw can be easily calculated by means of the following mathematical functional relationships: $\Delta w=-(H2-H1)/2$.

In step S104, the TCP 151 of the tool 15 is first moved back to its original position P1. The position parameters of the preset position P0 of the TCP 151 that are stored within the control software of the controller 30 are updated by adding the value of the deviation Δw. In the embodiment, the coordinate value of the preset position P0 of the TCP 151 relative to the basic tool coordinate system is changed into ($X_g$+Δw, Yg, Zg) and defined as a newly preset position P0' (i.e., a newly estimated position) of the TCP 151. A new preset coordinate system TG' is thus established based on the newly preset position P0' of the TCP 151 of the tool 15. The new preset coordinate system TG' includes three coordinate axes WG'-axis, VG'-axis and UG'-axis positioned parallel to the corresponding three coordinate axes X-axis, Y-axis and Z-axis of the basic tool coordinate system T0 respectively. A deviation between the new preset position P0' of the TCP 151 and the actual position of the TCP 151 (P1) is defined as ΔP' (0, Δv, Δu). Namely, the deviation between the origin of the newly preset coordinate system P0'($X_g$+Δw, Yg, Zg) and the actual position of the TCP 151 (P1) is defined as ΔP'(0, Δv, Δu).

Figure 5:
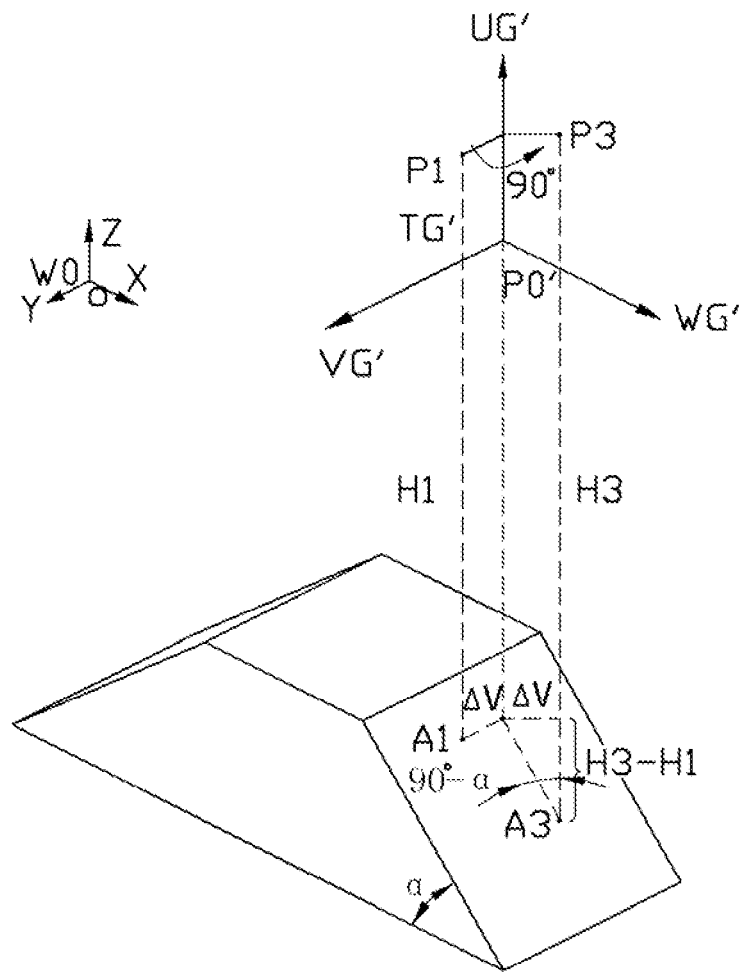

Referring to FIG. 5, in step S105, the new preset position P0' of the TCP 151 of the tool 15 is driven to rotate about the UG'-axis of the new preset coordinate system TG' by about 90 degrees, resulting in the actual position of the TCP 151 (P1) moving to a position P3. The corresponding coordinate value of the actual TCP 151 positioned at the position P3 relative to the newly preset coordinate system TG' can be designated as P3 (0, V3, U3). The sensor 17 emits laser beams toward the inclined surface 201 downwards, and forms a corresponding projected point A3 on the inclined surface 201.

The sensor 17 then measures a distance H3 between the position P3 and the projected point A3 of the inclined surface 201. Since the TCP 151 of the tool 15 is rotated relative to the UG'-axis direction of the new preset coordinate system TG' by about 90 degrees, the following mathematical functional relationships can be easily established: $|H3-H1|*\tan(90°-\alpha)=|\Delta v|$. Thus the value of Δv can be easily calculated by means of the aforementioned mathematical functional relationships. In the illustrated embodiment where the surface 201 inclines downward along the positive WG-axis and the included angle α is 45 degrees, the value of Δv can be easily calculated by means of the following mathematical functional relationships: $\Delta v=H3-H1$.

In step S106, the TCP 151 of the tool 15 is first moved back to its original position P1. The position parameters of the new preset position P0' of the TCP 151 that are stored within the control software of the controller 30 are amended or updated by adding the value of the deviation Δv. In the embodiment, the corresponding coordinate value of the preset position P0' of the TCP 151 relative to the basic tool coordinate system T0 is changed into ($X_g$+Δw, $Y_g$+Δv, Zg) and defined as a new preset (i.e., new estimated) position P0" of the TCP 151. A new preset coordinate system TG" is thus established based on the newly preset position P0" of the TCP 151 of the tool 15. The new preset coordinate system TG" includes three coordinate axes WG"-axis, VG"-axis and UG"-axis positioned parallel to the corresponding three coordinate axes X-axis, Y-axis and Z-axis of the basic tool coordinate system T0, respectively. A deviation between the new preset position P0" of the TCP 151 and the actual position of the TCP 151 (P1) is defined as ΔP" (0, 0, Δu). Namely, the deviation between the origin of the newly preset coordinate system P0"(Xg+Δw, Yg+Δv, Zg) and the actual position of the TCP 151 (P1) is defined as ΔP"(0, 0, Δu).

Figure 6:
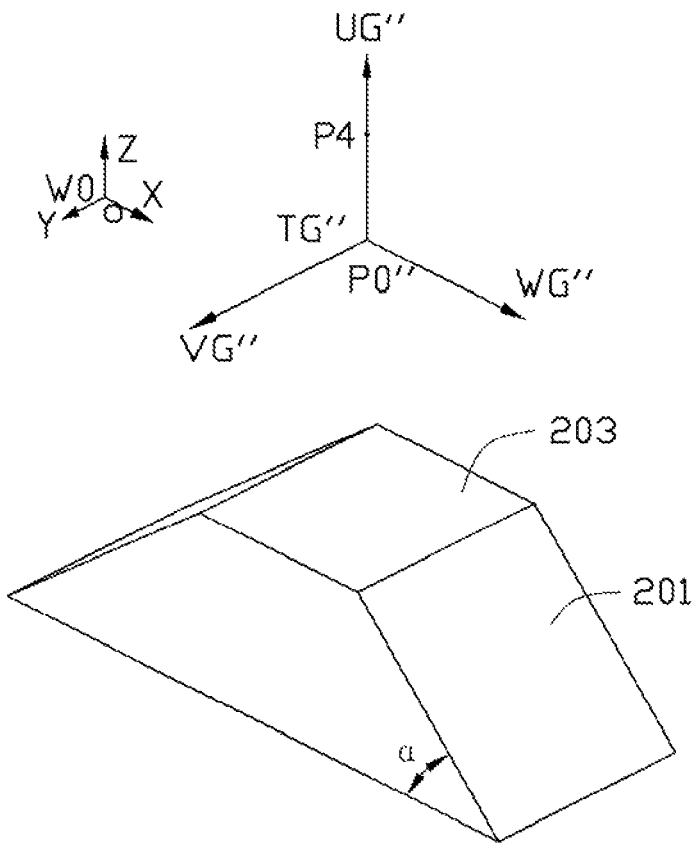

FIG. 6, shows that in step S107, the TCP 151 of the tool 15 is driven to move to a position above the planar top surface 203 without changing the orientation of the basic tool coordinate system T0, and hence without changing the orientation of the new preset coordinate system TG". The coordinate value of the actual TCP 151 formed within the preset coordinate system TG" is defined as P4(0, 0, Δu). The sensor 17 emits laser beams toward planar top surface 203 downwards, and forms a corresponding projected point A4 on the planar top surface 203. The sensor 17 then measures a distance H4 between the position P4 and the projected point A4 of the planar top surface 203.

Figure 7:
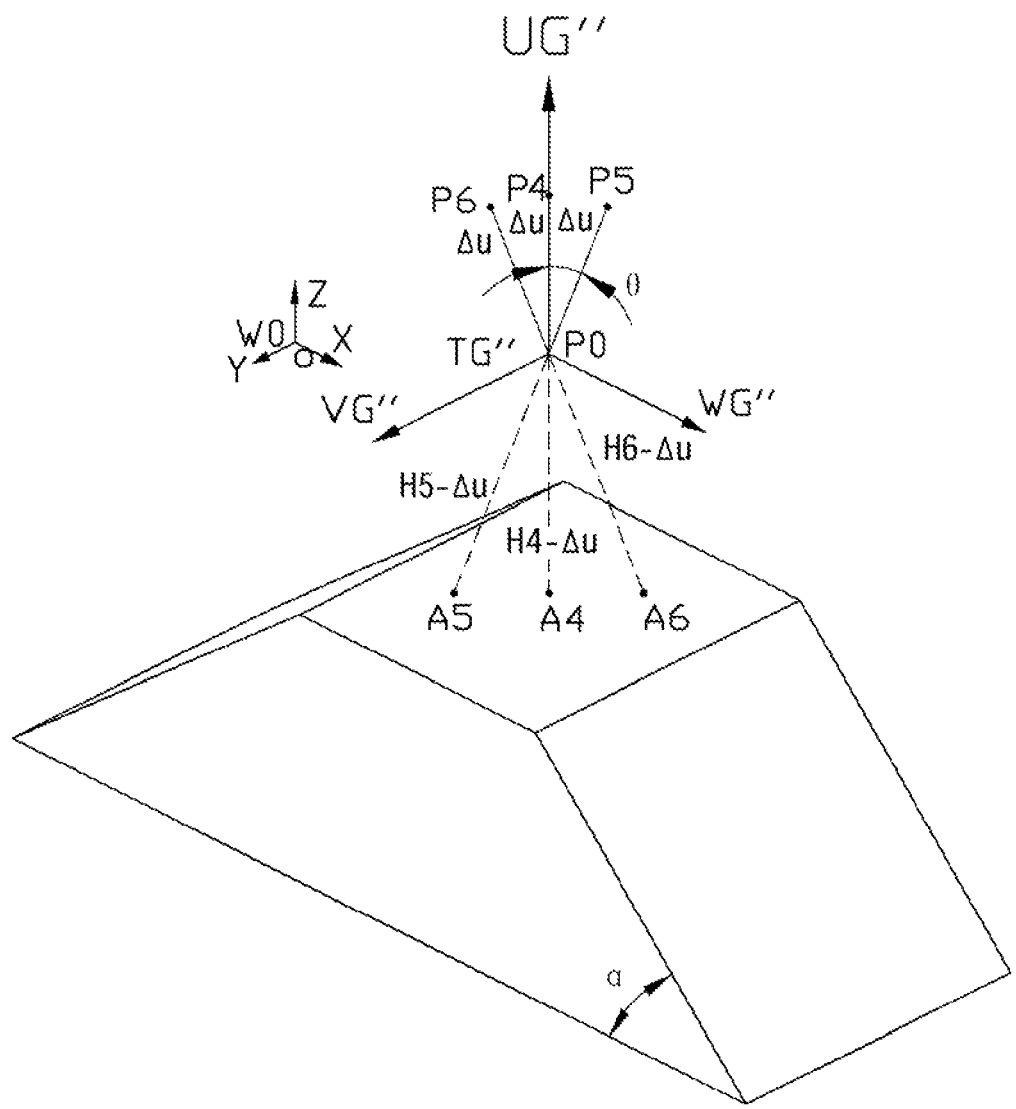

FIG. 7, shows in step S108, the new preset position P0" of the TCP 151 of the tool 15 is driven to rotate by about θ degrees relative to the VG" axis of the new preset coordinate system TG", resulting in the actual position P4 of the TCP 151 moving to a position P5. In the illustrated embodiment, a value of the rotation angle θ is 30 degrees. Following the rotation of the TCP 151, the sensor 17 emits laser beams towards the planar top surface 203 defining an inclined angle of θ degrees relative to the vertical direction, and forms a corresponding projected point A5 on the planar top surface 203. The sensor 17 then measures a distance H5 between the position P5 and the projected point A5. Whether position P4 is positioned in the upper or lower quadrant of the preset coordinate system TG" (i.e., whether Δu is positive or negative), the following mathematical functional relationships can be easily established: (H4−Δu)/(H5−Δu)=cos θ, that is: Δu= (H4−H5*cos θ)/(1−cos θ). Since the rotation degree θ is 30 degrees in the illustrated embodiment, thus the mathematical functional relationships can be equaled as: (H4−Δu)/(H5−Δu) =cos 30°, namely, Δu =(H4−H5*cos 30°)/(1−cos 30°).

In order to reduce the error caused by misalignment (i.e., caused by the UG" coordinate axis not being perfectly perpendicular to the planar top surface 203), the value of Δu can be measured again by driving the TCP 151 of the tool 15 to rotate by −θ degrees relative to the VG"-axis (i.e., rotate in a direction opposite to the aforementioned rotation), resulting in the actual position P4 of the TCP 151 moving to a position P6. The sensor 17 emits laser beams towards the planar top surface 203 defining an inclined angle of θ relative to the vertical direction, and forms a corresponding projected point A6 on the planar top surface 203. The sensor 17 then measures a distance H6 between the position P6 and the projected point A6. The following mathematical functional relationships can be easily established: (H4−Δu)/(H6−Δu)=cos θ, namely Δu=(H4−H6*cos θ)/(1−cos θ). Thus, the final value of Δu can be calculated by averaging the values of Δu calculated from measuring H5 and Δu calculated from measuring H6. The above procedure for finding the value of Δu can also be achieved by rotating θ or −θ degrees with respect to the WG" axis instead of the VG" axis.

The TCP 151 of the tool 15 is then moved back to its original position P1. The position parameters of the preset position P0" of the TCP 151 that are stored within the control software of the controller 30 are amended or updated by adding the value of the deviation Δu. In the embodiment, the coordinate value of the preset position P0" of the TCP 151 relative to the basic tool coordinate system T0 is correspondingly changed into (Xg+Δw, Yg+Δv, Zg+Δu). Thus the coordinate value of the preset position P0" is equal to the actual coordinate value of the TCP 151 at an ideal condition, when neglecting alignment error between the basic tool coordinate system axes and the projection surfaces of the assistant indicating tool 200, and neglecting alignment error between the basic tool coordinate system axes and the laser beam direction. To account for such alignment errors, any remaining deviations between the preset position P0" and the actual coordinate value of the TCP 151 can be reduced iteratively until the deviations reach an acceptable value, as described below.

In step S109, The deviation ΔP (Δw, Δv, Δu) between the preset position P0 of the TCP 151 and the actual position of the TCP 151 (P1) is calculated by means of the aforementioned functional relationships. The deviation ΔP is compared with the maximum allowable deviation of the TCP position of the robot manipulator 100 (this maximum allowable deviation can be set by the robot user or the robot manufacturer). If the deviation ΔP is less than or equal to the maximum allowable deviation of the TCP position of the robot manipulator 100, the preset position P0" of the TCP 151 then can be considered as the actual position of the TCP 151 (P1) thereby completing the coordinate correction work. By means of this procedure, there is no need to further adjust the coordinates of the TCP 151 of the robot manipulator 100. The corresponding coordinate value (Xg+Δw, Yg+Δv, Zg+Δu) of the preset position P0" of the TCP 151 within the basic tool coordinate system T0 can be directly considered as the actual position of the TCP 151 (P1).

If the deviation ΔP is greater than the maximum allowable deviation of the TCP of the robot manipulator 100, there is deemed a major deviation between the preset position P0" of the TCP 151 and the actual position P1 of the TCP 151. The coordinate value (Xg+Δw, Yg+Δv, Zg+Δu) of the preset position P0" of the TCP 151 can be considered as a new preset position of the TCP 151. The aforementioned steps S101~S109 are repeated until the deviation between the preset position of the TCP 151 and the actual position of the TCP 151 is less than or equal to the maximum allowable deviation of the TCP of the robot manipulator 100, so as to altogether complete the coordinate correction process to the tool center point 151 of the robot manipulator 100 and thereby obtain the correct position of the actual TCP 151 based on the basic tool coordinate system.

In another embodiment, the coordinate axes of the preset coordinate system $T_G$ are not parallel to the corresponding coordinate axes of the basic tool coordinate system T0. The order sequence of the step S103 can be interchanged or switched with the step S105.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A calibration method for a tool center point (TCP) of a robot manipulator, the robot manipulator comprising a drive mechanism, a controller for controlling the drive mechanism, a tool assembled to a distal end of the drive mechanism and having a tool center point (TCP), and a sensor positioned on a distal end of the tool; the robot manipulator has a basic tool coordinate system having three axes, the calibration method comprising the following steps:

providing an assistant indicating tool cooperating with the robot manipulator, the assistant indicating tool comprising a planar top surface and an inclined surface defining an included angle a relative to the horizontal plane;

driving the tool to move to face the inclined surface, sensing a distance H1 between the position of TCP and the inclined surface;

defining a preset position P0 of the TCP and establishing a preset coordinate system TG based on the preset position P0 comprising three coordinate axes WG-axis, VG-axis and UG-axis, the VG-axis projecting to the inclined surface at a same height;

driving the tool to rotate relative to UG-axis of the preset coordinate system TG by substantially 180 degrees, resulting in the actual TCP of the tool moving to a position P2; the sensor sensing a distance H2 between the position P2 and the inclined surface, establishing the relationship: $\Delta w=|H1-H2|*\tan(90°-\alpha)/2$, thus obtaining the value of the $\Delta w$;

updating the position parameters of the preset TCP by adding the value of the deviation $\Delta w$, and then establishing a new preset coordinate system based on the updated preset TCP comprising three coordinate axes WG'-axis, VG'-axis and UG'-axis, the VG'-axis projecting to the inclined surface at a same height;

driving the tool to rotate relative to UG'-axis of the preset coordinate system at substantially 90 degrees, resulting in the actual TCP of the tool moving to a position P3; the sensor sensing a distance H3 between the position P3 and the inclined surface, establishing the relationship: $\Delta v=|H1-H3|*\tan(90°-\alpha)$, thus obtaining the value of the $\Delta v$;

updating the position parameters of the preset TCP by adding the value of the deviation $\Delta v$, and then establishing a newly preset coordinate system based on the updated preset TCP, driving the tool to move over the planar top surface, and then the sensor sensing a distance H4 between the TCP and the planar top surface;

driving the tool to rotate relative to an axis of the newly preset coordinate system parallel to the horizontal plane by substantially θ degrees, resulting in the actual TCP of the tool moving to a position P5; the sensor following the tool rotating θ degrees, and sensing a distance H5 between the position P5 and the horizontal surface; and then establishing the relationship $\Delta u=(H4-H5*\cos\theta)/(1-\cos\theta)$, thus obtaining the value of the $\Delta u$;

comparing the deviation $\Delta P(\Delta w, \Delta v, \Delta u)$, wherein $\Delta P$ is the deviation between the preset position P0 and the actual position of the TCP, with a maximum allowable deviation of the robot manipulator;

wherein, if the deviation $\Delta P$ is less than or equal to the maximum allowable deviation of the TCP of the robot manipulator, the preset position P0 of the TCP is thereby considered as the actual position of the TCP and completing the coordinate correction work; if the deviation $\Delta P$ is greater than the maximum allowable deviation of the robot manipulator, then, updating the position parameters of the preset position of the TCP by adding a deviation $\Delta u$, and repeating the calibration method for the tool center point till the final deviation is less than or equal to the maximum allowable deviation of the robot manipulator.

2. The calibration method of claim 1, wherein the robot manipulator further comprises a base, the drive mechanism is mounted on the base and connected with the controller, the controller comprises a preset control software installed therein for driving and controlling the drive mechanism to work.

3. The calibration method of claim 2, wherein a point of origin of the basic tool coordinate system is established at the distal link of the robot, and the preset position P0 is positioned adjacent to the actual TCP of the tool.

4. The calibration method of claim 3, wherein the three coordinate axes WG-axis, VG-axis and UG-axis of the preset coordinate system TG are positioned parallel to the corresponding three coordinate axes X-axis, Y-axis and Z-axis of the basic tool coordinate system respectively, the coordinate value of the origin P0 of the preset coordinate system TG is stored into the controller.

5. The calibration method of claim 1, wherein the drive mechanism is a multi-axis drive mechanism.

6. The calibration method of claim 1, wherein the calibration method further includes driving the TCP of the tool to move back to its original position P1 before rotating the tool to rotate about another axis.

7. The calibration method of claim 1, wherein the sensor is a laser displacement sensor, and emits laser beams to measure the distance between the sensor and the assistant indicating tool.

8. The calibration method of claim 7, wherein, the sensor is assembled within the tool, and the laser radiating point of the sensor coincides with the TCP.

9. The calibration method of claim 1, wherein, the inclined surface defines a 45 degrees included angle a relative to the planar top surface; the rotating angle of the tool relative to the axis of the basic coordinate system parallel to the horizontal plane is 30 degrees.

10. A calibration method for tool center point (TCP) of a robot manipulator, the robot manipulator comprising a drive mechanism, a controller for controlling the drive mechanism, a tool assembled to a distal end of the drive mechanism and having the tool center point (TCP), and a sensor positioned on a distal end of the tool; the robot manipulator has a basic coordinate system having three axes, the calibration method comprising the following steps:

providing an assistant indicating tool cooperating with the robot manipulator, the assistant indicating tool comprising a planar top surface and an inclined surface defining an included angle a relative to the vertical direction;

driving the tool to move to face the inclined surface, sensing the distance H1 between the actual position of TCP and the inclined surface;

defining a preset position P0 of the TCP and establishing a preset coordinate system TG based on the preset position P0 comprising three coordinate axes WG-axis, VG-axis and UG-axis, the VG-axis projecting to the inclined surface at a same height;

driving the tool to rotate relative to UG-axis of the preset coordinate system by substantially 90 degrees, resulting in the actual TCP of the tool moving to a position P3; the sensor sensing a distance H3 between the position P3 and the inclined surface, establishing the relationship: $\Delta v=|H1-H3|*\tan(90°-\alpha)$, thus obtaining the value of the $\Delta v$;

updating the position parameters of the preset TCP by adding a deviation $\Delta v$, and then establishing a new preset coordinate system based on the updated preset TCP comprising three coordinate axes WG'-axis, VG'-axis and UG'-axis, the VG'-axis projecting to the inclined surface at a same height;

driving the tool to rotate relative to the UG'-axis of the preset coordinate system TG by substantially 180 degrees, resulting in the actual TCP of the tool moving to a position P2; the sensor sensing the distance H2 between the position P2 and the inclined surface, establishing the relationship: $\Delta w=|H1-H2|*\tan(90-\alpha)/2$, thus obtaining the value of the $\Delta w$;

updating the position parameters of the preset TCP by adding a deviation Δw, and then establishing a new preset coordinate system based on the amended preset TCP, and then driving the tool to move over the planar top surface, and then sensing the distance H4 between the TCP and the planar top surface;

driving the tool to rotate relative to a axis of the basic tool coordinate system parallel to the horizontal plane by substantially θ degrees, resulting in the actual TCP of the tool moving to a position P5; the sensor following the tool rotating θ degrees, and sensing the distance H5 between the position P5 and the horizontal surface; and then establishing the relationship $\Delta u=(H4-H5*\cos\theta)/(1-\cos\theta)$, thus obtaining the value of the Δu;

comparing the deviation ΔP(Δw, Δv, Δu), wherein ΔP is the deviation between the preset position P0 and the actual position of the TCP, with a maximum allowable deviation of the robot manipulator;

wherein, if the deviation ΔP is less than or equal to the maximum allowable deviation of the robot manipulator, the preset position P0 of the TCP is thereby considered as the actual position of the TCP and completing the coordinate correction work; if the deviation ΔP is greater than the maximum allowable deviation of the robot manipulator, then, updating the position parameters of the preset position of the TCP by adding a deviation Δu, and repeating the calibration method for the tool center point till the final deviation is less than or equal to the maximum allowable deviation of the robot manipulator.

11. The calibration method of claim 10, wherein the robot manipulator further comprises a base, the drive mechanism is mounted on the base and connected with the controller, the controller comprises a preset control software installed therein for driving and controlling the drive mechanism to work.

12. The calibration method of claim 11, wherein an origin of the basic tool coordinate system is established at distal link of the robot manipulator, and the preset position P0 is positioned adjacent to the actual TCP of the tool.

13. The calibration method of claim 12, wherein the three coordinate axes WG-axis, VG-axis and UG-axis of the preset coordinate system TG are positioned parallel to the corresponding three coordinate axes X-axis, Y-axis and Z-axis of the basic tool coordinate system respectively, the coordinate value of the origin P0 of the preset coordinate system TG is stored into the controller.

14. The calibration method of claim 10, wherein the drive mechanism is a multi-axis drive mechanism, and the tool is a pneumatic claw.

15. The calibration method of claim 10, wherein the calibration method further includes driving the TCP of the tool to move back to its original position P1 before rotating the tool to rotate about another axis.

16. The calibration method of claim 10, wherein the sensor is a laser displacement sensor, and emits a laser beam to measure the distance between the sensor and the assistant indicating tool.

17. The calibration method of claim 16, wherein, the sensor is assembled within the tool and the laser radiating point of the sensor coincides with the TCP.

* * * * *